United States Patent [19]

Hess et al.

[11] 3,737,874

[45] June 5, 1973

[54] CAPACITIVE READ ONLY MEMORY

[75] Inventors: George A. Hess, Acton; John H. Kefalas, Billerica; Richard D. MacInnes, Littleton, all of Mass.

[73] Assignee: Honeywell Information Systems Inc., Waltham, Mass.

[22] Filed: Dec. 3, 1970

[21] Appl. No.: 94,719

[52] U.S. Cl. ....................340/173 SP, 340/173 R

[51] Int. Cl. ....................G11c 17/00

[58] Field of Search ....................340/173 SP

[56] References Cited

UNITED STATES PATENTS

| | | | |
|---|---|---|---|
| 3,159,820 | 12/1964 | Oden | 340/173 R |
| 3,183,490 | 5/1965 | Cubbage | 340/173 SP |
| 3,593,319 | 7/1971 | Barber | 340/173 SP |
| 3,003,143 | 10/1961 | Beurrier | 340/173 |
| 3,077,591 | 2/1963 | Akmenkalns | 340/173 |
| 3,585,368 | 6/1971 | Nunamaker | 340/173 |

OTHER PUBLICATIONS

"Capacitive Card Read–Only Memory" W. W. Sproul, III, IBM Tech. Disc. Bul., Vol. 9 No. 7, December 1966, p. 839–840

*Primary Examiner*—Terrell W. Fears

*Attorney*—Ronald T. Reiling, Fred Jacob and John M. Gunther

[57] ABSTRACT

A capacitive read only memory which has a ground plane with a plurality of holes, a plurality of word conductors insulated from and disposed over one surface of the ground plane, and a plurality of sense conductors insulated from and disposed on the other surface of the ground plane. The word and sense conductors are substantially orthogonal to one another so as to define a plurality of conductor intersections, at least some of which correspond with the holes in the ground plane. An intersection position at which there is no hole identifies one of the binary storage states, while an intersection position corresponding with a hole in the ground plane identifies the other storage state.

4 Claims, 5 Drawing Figures

INVENTORS
GEORGE A. HESS
JOHN H. KEFALAS
RICHARD D. MacINNES
BY John Chapman
ATTORNEY

CAPACITIVE READ ONLY MEMORY

BACKGROUND OF THE INVENTION

This invention relates to a data storage device for computers or the like and more particularly to a memory device which utilizes capacitive storage elements which represent the binary states representing one of the binary states of stored information.

A number of devices are known in the art which store information in a plurality of capacitors by representing the information by the presence or absence of a capacitor or the degree of capacitance at a particular point. In a familiar configuration of capacitive memory elements, row and column conductors are orthogonally arrayed on opposite sides of a dielectric sheet to define a coordinate matrix of conductor intersections. The insulating sheet selected for such use is characterized by a high permittivity or dielectric constant. At positions on the sheet corresponding to the intersection of a row and column conductor, between which no capacitive coupling is desired, sections of the dielectric sheet are removed. This condition designates, for example, the storage of a binary ONE. At positions on the dielectric sheet corresponding to the intersection of a row and column conductor of the matrix at which there exists capacitive coupling, the dielectric is maintained intact. This condition would designate the storage of a binary ZERO.

The stored information is read out of the capacitive memory by applying pulses successively to one set of conductors, for example the row conductors, and sensing the existence of the capacitive couplings between the row conductors and the other set of conductors, the column conductors. The sensing procedure is performed by detecting the pulses transmitted to the column conductors through the dielectric portions of the sheet.

A problem which confronts users of capacitive storage is that the output signals are dependent upon the information stored within the memory. More specifically, the undesirable situation is that the number of capacitive couplings corresponding to a given column conductor varies between column conductors. Therefore, the total capacitance per each column conductor may be different.

Various capacitance compensation approaches have been suggested in order to present a substantially uniform total capacitance associated with each column conductor. One approach known in the art is to add a very large capacitance at the end of each column conductor so that the total capacitance is much larger than the maximum possible capacitance of any of the column conductors. Then, the total capacitance associated with each of the column conductors does not vary by more than a nominal percentage. This approach, however, reduces the output signal to a fraction of its original value.

Another compensation approach is a balanced capacitive scheme. The row conductor has associated with it a balance line, which contains a complementary pattern that couples it capacitively to the column conductors. Each storage location or bit is made up of the capacitive intersection of a row conductor and a balance line with a pair of column conductors. The disadvantage with this approach is that additional memory components are necessary, which requirement increases the cost of memory fabrication and decreases the density of capacitor storage which would otherwise be possible.

It is therefore an object of the present invention to provide a capacitive memory which alleviates the problem of an information sensitive signal output.

It is a further object of the present invention to provide a data storage device which has a high storage density and low cost.

It is yet another object of the present invention to provide a capacitive memory without a reduced signal output.

Other objects of the invention will be evident from the description described hereinafter.

SUMMARY OF THE INVENTION

The invention provides a capacitive read only memory for the storage of binary coded information. A feature of the invention is the utilization of a conductive ground plane which has a plurality of holes through its outer surfaces. The outer surfaces of the ground plane are covered by an insulating layer of dielectric material. The upper insulated surface bears a plurality of word conductors which extend over the insulated surface and are substantially parallel with one another. On the other insulated surface of the plane are disposed a plurality of sense conductors which extend substantially parallel to each other and transverse to the word conductors. The resulting intersections of the word and sense conductors are aligned with the holes in the ground plane and define a plurality of storage locations. The locations of holes in the ground plane allow for capacitive couplings between the respective word and sense conductors at the hole locations. The existence of a hole in the ground plane or alternatively a capacitive coupling would represent a binary ONE, while the lack of such a hole or coupling would represent a binary ZERO. The existence of a capacitive coupling would be sensed by first applying a pulse to at least one of the word conductors and detecting whether or not a pulse would be transmitted to the respective sense conductors through respective holes in the ground plane.

Another feature of the invention is that the dielectric material extends through the holes in the ground plane, as well as filling the spaces between the word and sense conductors and the ground plane.

A further feature of the invention is that the word conductors have a width which is sufficient to cover the extremities of the holes of the ground plane at the point at which they pass over the holes.

Still another feature of the invention is the employment of conductive pads along the sense conductors which correspond in area and position with the holes in the ground plane.

Yet another feature of the invention is that the area of the pads, the width of the sense conductor on which the pads are located, the distance between the centers of the word conductors, and the distances between the word and sense conductors from the ground plane are prescribed in order that the capacitance per unit length on each of the sense conductors is substantially uniform.

These and other features which are considered to be characteristic of the invention are set forth with particularity in the appended claims. The invention itself, however, as well as additional objects and features thereof will best be understood from the following description when considered in conjunction with the accompanying drawings.

DESCRIPTION OF THE PREFERRED EMBODIMENT

Figure 1:
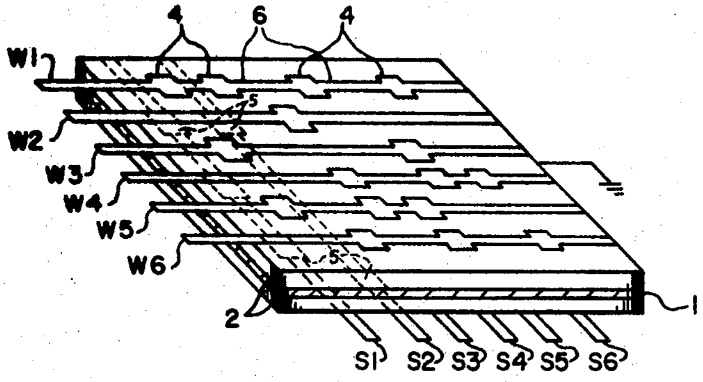
FIG. 1 is a perspective view of a capacitive storage matrix in accordance with one embodiment of the invention.

The invention provides a ground plane 1, as shown in FIG. 1, which is a conductive surface connected to a ground potential. On the outer surfaces of the ground plane 1 are coated sheets or layers of dielectric material 2. A plurality of word conductors W1 to W6 are disposed over the upper dielectric layer 2 and are arranged respectively parallel and equidistant from one another.

On the surface of the other dielectric layer 2 are disposed a plurality of sense conductors S1 to S6 which extend substantially orthogonal to the word conductors W1 to W6 and are substantially parallel and equidistant from one another.

The dielectric insulating layers 2 are of a material which preferably has a high permittivity or dielectric constant. The word conductors W and the sense conductors S are conductive elements which are plated on their respective dielectric layers by the electroless deposition of a conductive material over the dielectric layers and a subsequent etching of the conductors to the desired conductive configuration. Other printed circuit techniques, well known in the art, would be suitable for producing the conductive structure of the present invention.

Conductive pads 4 are shown in FIG. 1 to be distributed along the word conductors W1 to W6 at prescribed locations. The conductive pads 4 are of square surface area and preferably are an integral part of their respective word conductors W by virtue of the word conductors W being etched to have such pads 4 at prescribed locations. Alternatively, the conductive pads 4 may be conductively attached to the word conductors W by any one of a number of suitable means known in the art. Conductive pads 5, as shown in FIG. 1, are likewise positioned along respective sense conductors S1 to S6, opposite the conductive pads 4. The sets of conductive pads 4 and 5 identify various storage locations within the capacitive matrix of FIG. 1. Positions 6 identify along word conductor W1, and also along the remaining word conductors W2 to W6, the remaining intersections between the word and sense conductors, and thusly the remaining storage locations within the capacitive matrix of FIG. 1.

Figure 2:
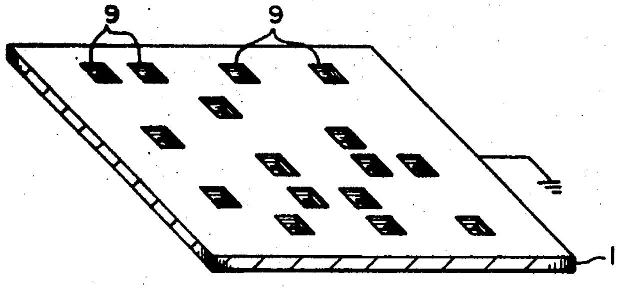
FIG. 2 represents the ground plane employed in the embodiment of FIG. 1 and embodies features of the invention.

The ground plane 1 is shown in FIG. 2 to contain a plurality of holes 9. A comparison of the location of the holes 9 in the conductive plane 1 with the location of the pads 4 and 5 in the matrix of FIG. 1 shows that the holes 9 are located between each of the respective pads 4 and 5. The holes 9 provide for the capacitive coupling associated with each set of pads 4 and 5 when a current is applied to at least one of the word conductors W. The dielectric material of layers 2 preferably extends through the holes 9. In this preferred embodiment, this desired dielectric layer 2 is obtained by dip coating the ground plane 1.

The existence of sets of pads 4 and 5 and a dielectric coupling of the respective pads within each set represents the storage of a binary ONE; while the positions 6 have no capacitive coupling between the word and sense conductors and indicate a stored binary ZERO. The location of sets of coupled pads 4 and 5 at prescribed positions along the word conductors W and respective sense conductors S allows for a permanent storage of binary ONE's and ZERO's within the capacitive matrix of FIG. 1.

Figures 3, 4A, 4B:
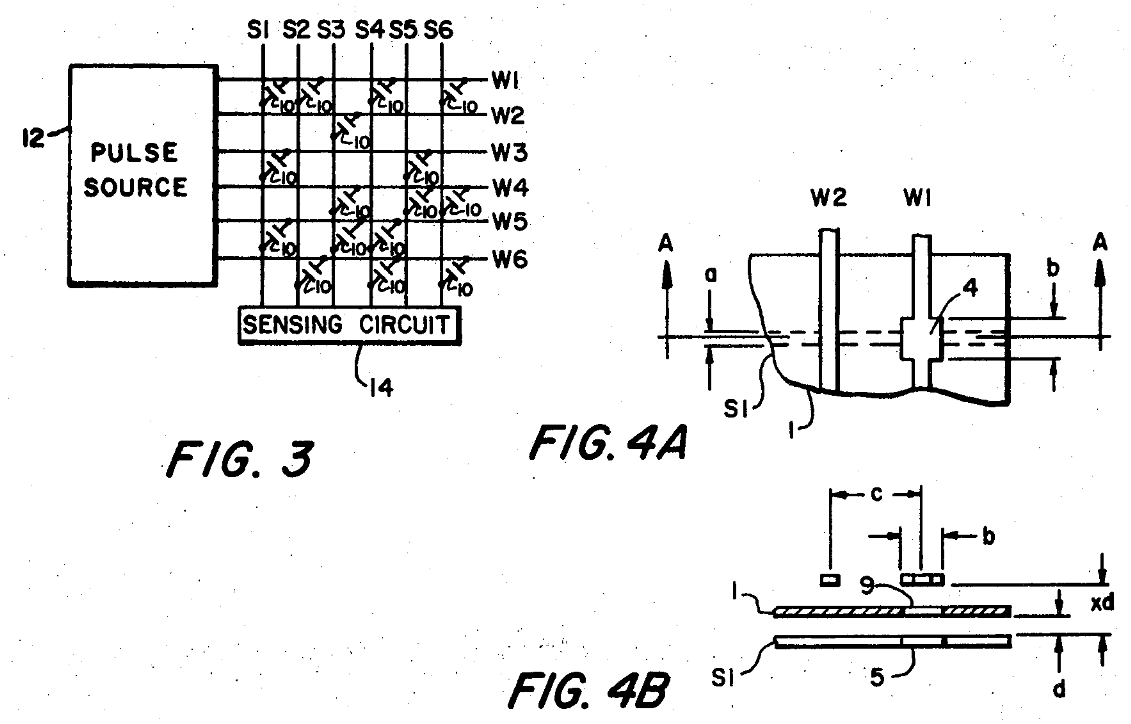
FIG. 3 represents a schematic diagram of the capacitive couplings provided by the prescribed holes through the outer surfaces of the plane of FIGS. 1 and 2.
FIG. 4*a* is a top view of a cut-a-way of the upper left hand corner of the matrix in FIG. 1.
FIG. 4*b* is a section of the cut-a-way of FIG. 4*a* along line A.

A schematic form of the capacitive matrix of FIG. 1 is shown in FIG. 3 with associated equipment for reading out the information stored within it. The capacitive couplings 10 shown in FIG. 3 have been arranged to correspond to the functional capacitive couplings described to exist between respective pads 4 and 5 within the matrix of FIG. 1. In the schematic diagram of FIG. 3, word conductors W1 to W6 and sense conductors S1 to S6 are arranged with intersections between every pair of respective word and sense conductors. Capacitive couplings 10 at selected conductor crossovers are represented by capacitors situated at particular locations which, in accordance with the binary assignment chosen above, represent binary ONE's. The absence of such capacitive couplings 10 represents the storage of binary ZERO's at the remaining conductor intersections.

In reading out the stored information, each of the word conductors may be interrogated by the successive application of read out pulses from the pulse source 12 connected to the word conductors W1 to W6. When a pulse is applied to a word conductor W, pulses appear on the sense conductors S1 to S6 which are coupled through capacitors 10 to the interrogated word conductor W. The output pulses are applied to the sensing circuit 14 which serves to interpret such pulses collectively as the binary word which is stored in the matrix at the selected word conductor W.

The invention also provides for the establishment of uniform capacitance per unit length on each of the sense conductors S1 to S6 by the design of the physical parameters of the capacitive matrix of FIG. 1 in accordance with a prescribed relation with one another. The relevant parameters are shown in a cut-a-way view of the capacitive matrix, as shown in FIG. 4. FIG. **4*a* is a top view of two bit locations, while FIG. 4*b* is a sectional view through the bit locations at line A of FIG. 4*a***. The parameters are defined as follows:

$a$ is the width of each of the sense conductors S, $b$ is the width of the square surface area of the conductive pads 4 and 5, $c$ is the distance between the centers of the word conductors W, $d$ is the distance between the sense conductors S and the ground plane 1, and $xd$ is the distance between the word conductors W and the ground plane 1.

These parameters are prescribed according to the relation $$x = b^2/[ac-(b-c)^2].$$

While in the preferred embodiment the parameters are to be defined in accordance with this equation, a partial conformity of the parameter dimensions with respect to the situation defined by the equation would suffice to practice the present invention.

An example of the preferred embodiment of the invention would be a capacitive matrix having sense conductors S with a 10 mil width, conductive pads 4 and 5 with 30 mil widths, word conductors W spaced at 40 mil centers, and the word conductors W spaced from the ground plane 1 at a distance of 3*d*, where the distance d is that distance between the ground plane 1 and the sense conductors S.

Obviously, many modifications of the present invention are possible in light of the above teaching. It is therefore to be understood that, the scope of the appended claims, the invention may be practiced otherwise than as specifically described.

What is claimed is:

1. A capacitive memory comprising:

a. a conductive plane having a plurality of holes;

b. a first and second insulating surface each juxtaposed with said conductive plane;

c. a plurality of word conductive disposed on said first insulating surface;

d. a plurality of sense conductors disposed on said second insulating surface;

e. said sense conductors and said word conductors defining a plurality of intersections at least some of which correspond with said plurality of holes in said conductive plane;

f. a number of conductive pads located on said word and said sense conductors, said pads being in alignment with said plurality of holes; and g. wherein the distance between the word conductors and the conductive plane is a multiple x of the distance between the sense conductors and the conductive plane as defined by the formula $$x = b^2/ac - (b-c)^2$$

wherein $a$ is the width of said sense conductors, $b$ is the width of the conductive pads, $c$ is the distance between said sense conductors and said conductive plane, and $x$ defines the relationship that provides for a uniform capacitance per unit length.

2. A memory as defined in claim 1 wherein said plurality of holes of said conductive plane contains dielectric material, said dielectric material comprising part of said insulating surfaces.

3. The capacitive memory as defined in claim 1 wherein said first conductors are substantially orthogonal to said second conductors.

4. The capacitive memory as defined in claim 3 wherein said conductive pads have an enlarged substantially square surface area which is greater than the corresponding area of each conductor and said conductive plane has holes of substantially the same cross-sectional area as said conductive pad surface area.

* * * * *